June 4, 1935.  R. V. DERRAH  2,003,825
TORQUE TRANSMISSION DEVICE
Filed May 13, 1933
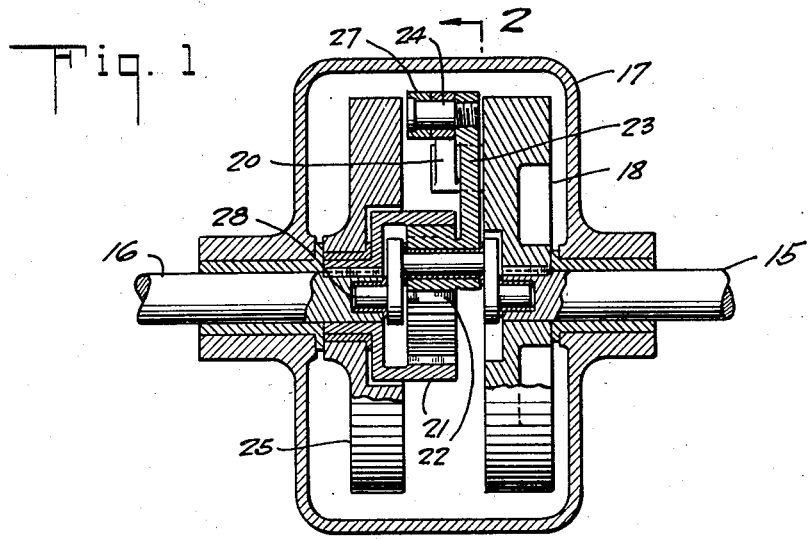
Fig. 1
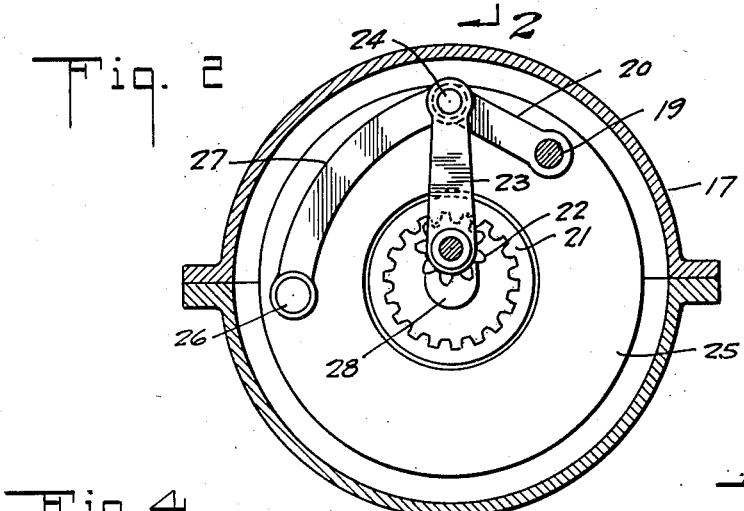
Fig. 2
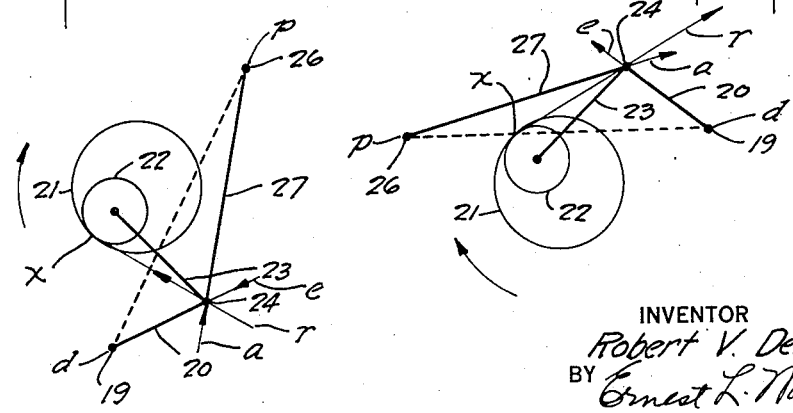
Fig. 4  Fig. 3
INVENTOR
Robert V. Derrah
BY Ernest L. Wallace
ATTORNEY Patented June 4, 1935

2,003,825

UNITED STATES PATENT OFFICE 2,003,825

TORQUE TRANSMISSION DEVICE

Robert V. Derrah, Beverly Hills, Calif.

Application May 13, 1933, Serial No. 670,830

23 Claims. (Cl. 74—259)

This invention relates to a torque transmission device where the speed ratio between a rotary driving member and a rotary driven member automatically adjusts itself to the load, the greater the load the greater the speed reduction. The present invention appertains to a torque transmission device wherein the changes in speed ratio are uninterrupted and the various elements of the train between driving and driven members are continuously coupled to one another.

The primary object of this invention is to provide a transmission of the character described comprising a mass so connected between the driving and driven members as to be vibratable by and in proportion to the differences in speed of the driving and driven members; said mass thereby periodically receiving and dispensing kinetic energy; and causing the mass to receive the major portion of its kinetic energy from the driving member and dispensing the major portion of its kinetic energy to the driven member. Another object of this invention is to provide a torque transmission comprising a mass so connected between the driving and driven members as to be vibrated with differences in speed of the driving and driven members; and to automatically shift the force reactions of said mass as applied to said driven member in such a manner as to cause a tendency to unidirectional rotation of the driven member. In addition to the broader objects of this invention there are certain details of construction as will be apparent from the subjoined description.

These objects are accomplished by means of the embodiment of my invention illustrated in the accompanying drawing, in which:—

Fig. 1 is a cross sectional view of a structure embodying the invention; Fig. 2 is a sectional view as seen on the plane indicated by 2—2 in Fig. 1; and Figs. 3 and 4 are diagrammatic views of the structure shown in Figs. 1 and 2 with force diagrams appended.

Referring to Figs. 1 and 2, a drive shaft is denoted by 15 and a driven shaft by 16. A housing 17 is shown having suitable bearings for shafts 15 and 16. Keyed to the drive shaft 15 is a fly wheel 18 having a crank pin 19. Pivotally mounted on pin 19 is a link 20.

Keyed to driven shaft 16 is an annular gear 21 and meshed therewith is a planet gear 22. Keyed or otherwise fixed to planet gear 22 is an arm or connecting rod 23. Link 20 is pivotally secured by a pin 24 to arm 23.

Idly mounted on the hub of annular gear 21 is a floating fly wheel 25 which provides a mass subjected to oscillatory vibration during its revolution. The floating fly wheel 25 has a pin 26 for securing a link 27 to pin 24.

The intermediate linkage comprising planet gear 22, connecting rod 23 and the hinged link formed by links 20 and 27 provide a toggle joint mechanism with a wrist at 24 for causing vibration of the floating fly wheel 25 relative to the annular gear 21, the latter being a portion of the driven member.

A crank shaft 28 is freely journalled in the ends of shafts 15 and 16, and journalled on the crank pin thereof is the planet gear 22. The crank shaft serves to restrain planet gear 22 to its orbital path.

Referring to Figs. 3 and 4, the structure of Figs. 1 and 2 is shown diagrammatically and two different positions of the parts are illustrated. It will be noted that two limiting conditions of relative rotation of the driving pin 19 and driven member 21 may occur. Driven member 21 may be allowed to freely rotate so that planet gear 22 does not roll upon the pitch line of the driven annular gear 21. Under such conditions, gear 21 will rotate with revolution of planet gear 22 as effected from the driving pin 19. Arm 23 and the hinged links 20 and 27 will maintain the same positions relative to one another. The result is that the floating fly wheel revolves synchronously with revolution of driver 19, there being no differential of motion between them. The other limiting condition is when the driven annular member 21 is held against rotation and remains stationary. Under such a condition, the planet gear 22 will roll on the pitch line in an opposite direction to the direction of revolution of the driver 19. For convenience of description, clockwise revolution or movement will be called positive and counter clockwise negative. Assuming positive revolution of the driver 19 and that annular gear 21 is stationary, planet gear 22 will roll in a negative direction on planet gear 21. With planet gear 22 having a pitch diameter one-half of the annular gear as shown, the planet gear will rotate about its own axis once in one revolution about the axis of the annular gear 21. The axis of planet gear 22 will therefore be turned negatively one revolution with respect to the axis of the annular gear. Due to the fact that the center of revolution of the arm is the axis of the planet gear and is eccentric to the axis of the annular gear, the pivot pin or wrist 24 forming the knee of the hinged link approaches and then recedes from the axis of the annular gear. The knee approaches twice in a revolution and recedes twice, or two cycles of movement to and fro relative to the axis of the annular gear are performed in one revolution of the driver. This causes during one revolution of the driver a movement of the fulcrum points d and p on the imaginary arm indicated by the dotted line away from one another then a shifting of these fulcrum of points toward one another and a repetition of the cycle. This causes a cycle of deceleration and acceleration of the floating fly wheel with respect to the driver and a repetition thereof during one revolution of the driver 19. In the diagrams of Figs. 3 and 4, the mass of the floating fly wheel may be considered as concentrated at pin 26. Annular gear 21 may be rotated positively so that a differential angular speed ratio may be obtained, this ratio being continuously variable between the limits heretofore mentioned. If there is a reaction at the point of contact between the teeth of the gears caused by the planet gear urging the annular gear to rotate and this reaction is positive at all positions in the travel of the planet gear in its orbit or during the major part of its travel, then the annular gear will be rotated positively proportionate to the torque resistance of the annular gear. In the device shown in Figs. 1 and 2, a tendency to rotate the annular gear unidirectionally is exerted by the intermediate mechanism between the driver and driven member as will be apparent from the following analysis.

Referring again to Fig. 3, it is assumed the driver 19 is revolved in a positive direction by an engine or prime mover. From the position where the planet gear and annular gear were positioned with their point of contact located in a vertical diameter of the planet gear to the position shown in Fig. 3, deceleration of the floating fly wheel has been taking place. Such deceleration continues until the point of contact has travelled in a negative direction to a point located in a horizontal diameter of the planet gear. A force diagram is shown in Fig. 3. The force exerted by the decelerating mass is proportionate to its deceleration and is compressive in rod 27, being indicated by the line $a$.

It is also compressive in rod 28 and is indicated by the line $e$. The resultant of forces $a$ and $e$ is indicated by $r$ passing through the contact point of the gears and is in a direction indicated by the arrow head and tends to rotate the annual gear 21 positively. An urge on the annular gear toward positive rotation is exerted throughout deceleration. After the reaction of the floating fly wheel has changed due to a change from deceleration to acceleration, there is tension in rods 27 and 28 causing compression in arm 23 and the reaction of the resultant force $r$ at the point of contact of the gears is in the same direction still urging annular gear 21 in a positive direction. This is due to a shifting of the resultant force fulcrum point $x$ from one side of the planet gear to the other and a change in the direction of the force. Thus, throughout the entire revolution of the driver 19 the annular gear is urged unidirectionally with a force proportionate to the acceleration and deceleration of the floating fly wheel. The magnitude of acceleration and deceleration of the floating fly wheel depends on the difference in angular speeds of the driving and driven members, since the rotation of annular gear 21 approaches the limiting condition where there is no throw of the wrist 24. The result is that the greater the difference in speeds between the driver 19 and the driven annular gear 21, the greater is the torque effort exerted tending to rotate the annular gear. Conversely the greater the torque resistance on the annular gear 21, the greater the difference in speeds of the driver 19 and driven annular gear 21 and the higher the effective gear ratio between the two.

An analysis of the action on the imaginary arm shows three fulcrum points on the arm $d$, $p$ and $x$. The fulcrum point $x$ shifts from one side of the rotational axis of the planet gear to the other so as to exert a reaction on annular gear 21 tending toward unidirectional rotation of the latter.

It will be apparent that the torque transmission disclosed herein is reversible, in that that the driving shaft may be employed as a driven shaft. The term "driving" and "driven" as used in the appended claims are interchangeable.

What I claim is:—

1. A torque transmission device comprising a driven rotor; a planet gear meshed with said driven rotor and constrained to revolve about the axis of said driven rotor; a revolving driving member coaxial with said driven rotor; a floating rotor coaxial with said driven rotor; a crank and connecting link securing said planet gear and said floating rotor, a link connecting said crank and driving member; said crank and link vibrating said floating rotor and shifting the position of the force reactions of said floating rotor on said planet gear in such manner as to react on said driven rotor with a tendency to unidirectional rotation of the latter.

2. A torque transmission device comprising a revoluble driving means; a driven annular gear coaxial with said driving means; an intermediate rotor mechanism including a planet rotor linking said driving means and the driven gear and constrained to revolve coaxially therewith; a floating fly wheel coaxial with said driving means and driven gear; a crank arm on said planet gear, a connecting rod securing said crank arm to said driving means, and a connecting rod securing said crank arm to said fly wheel.

3. A torque transmission device comprising an annular driven gear; a planet gear meshed with said driven gear and constrained to revolve about the axis of said annular gear; a revolving driving crank coaxial with said annular gear, a connecting rod securing said driving crank to an eccentric position on said planet gear; a floating wheel coaxial with said annular gear, a connecting rod securing said floating wheel to an eccentric axis on said planet gear whereby the wheel is vibrated and the force reactions of said floating wheel on said planet gear cause the latter to react on said annular gear with a tendency to unidirectional rotation of the latter.

4. A torque transmission device comprising a revoluble driven member, a revoluble driving member, a vibratable mass, a planetary part in train with one of said members, a connecting rod fixedly secured at one end to said planetary part, a link pivotally connecting said mass to said rod, and a link pivotally connecting the other of said members to said rod whereby upon revolution of said driving member said mass is vibrated and the force reactions thereof are transmitted to said driven members tending to unidirectional rotation of the latter.

5. A torque transmission device comprising a revoluble driven member, a revoluble driving member, a vibratable mass, a planetary part in train with one of said members, a wrist fixedly supported by and eccentric to planetary part, and a toggle joint link mechanism pivotally connected at one end to said mass and at the other end to the other of said members, said link mechanism being pivotally connected to said wrist to control buckling movement thereof whereby upon revolution of said driving member said mass is vibrated and the force reactions thereof are transmitted to said driven member tending to unidirectional rotation of the latter.

6. A torque transmission device comprising a revoluble driven member, a revoluble driving member, a vibratable mass, a planetary part in train with one of said members, a connecting rod fixedly secured at one end to said planetary part and having a wrist at the other end, and a toggle joint link mechanism pivotally connected at one end to the other of said members and at the other end to said mass, said link mechanism being pivotally connected at said wrist to said connecting rod whereby upon revolution of said driving member, said mass is vibrated and the force reactions thereof are transmitted to said driven member tending to unidirectional rotation of the latter.

7. A torque transmission device comprising a revoluble driven rotor, a revoluble driving member, a vibratable mass, a planetary member in train with said driven rotor, a toggle joint link mechanism coupling said mass to said driven rotor, and means operated by said planetary member to control buckling movement of said mechanism to and from the axis of said driven member and to transmit the force reactions of said mass to said driven rotor tending to unidirectional rotation of the latter.

8. A torque transmission device comprising a rotary driving member, a rotary driven member, a planetary gear in train with said driven gear revolving about its own axis in the direction of revolution of and at the same speed as said driving member whereby said axis revolves about the axis of rotation of said driven gear in a reverse direction and at a speed proportional to the difference in speed between said driving member and said driven gear, a connecting rod mounted on said planetary gear, a mass to be vibrated proportionally to said difference in speed, and a linkage connecting said rod to said driving member and to said mass whereby the force reactions resulting from the vibrations of said mass are imparted to said driven gear through said rod and said planetary gear.

9. A torque transmission device comprising a driven rotor having a rack circuitous to the axis of said rotor, a connecting rod, a pinion gear rigidly mounted on one end of said connecting rod and meshed with said rack, means for maintaining said pinion gear in mesh with said rack, a wrist on one end of said rod for transmitting thrusts to said rod, a revoluble driving member, a vibratable mass, and linkage connecting said driving member, said wrist and said mass to vibrate said mass and transmit the vibrations of said mass to said rod.

10. A torque transmission device comprising a driven gear revolvable about an axis, a planetary gear in train with said driven gear, a wrist on said planetary gear located to have a path of motion alternately toward and away from said axis, a revolvable driving member, a mass to be vibrated, a link connecting said driving member with a point on said planetary gear, and a link connecting said mass with said wrist, whereby said mass is vibrated by revolution of said driving member and the force reactions thereof are transmitted to said driven gear tending to unidirectional rotation of the latter.

11. A torque transmission device comprising a driven rotor revolvable about an axis and having a circuitous rack, a revolvable driving member, an intermediate driving crank revolved by said driving member, a mass to be vibrated by said crank, a link connecting a point on said crank with said mass to vibrate the latter, a gear mounted on said crank in mesh with said rack, and means maintaining said gear in mesh with said rack.

12. A torque transmission device comprising a revolvable driving member, a mass to be vibrated, a hinge jointed linkage, a pivot connecting one end of said linkage to said driving member, a pivot connecting the other end of said linkage to said mass, a driven rotor having a circuitous rack, and a planetary gear in train with said rack to be revolved thereabout, said linkage being connected to a point on said planetary gear having a nonuniform motion with respect to said driving member.

13. A torque transmission device comprising a driven gear revolvable about an axis, a planetary gear in train with said driven gear, a revolvable driving member, a linkage connected to said driving member, and a mass to be revolved by revolution of said driving member through said linkage toward and away from said axis, said linkage being connected to a point on said planetary gear having a path of motion alternately toward and away from said axis accordingly as the driving member revolves with respect to said driven gear thereby vibrating said mass whereby the alternate force reactions due to the vibration of said mass are transmitted through said linkage and said planetary gear to said driven gear in such manner as to exert an unidirectional rotational force on said driven gear about said axis.

14. A torque transmission device comprising a driven rotor revolvable about an axis, a revolvable driving member, a revolvable linkage connected to said driven rotor and to said driving member, a mass connected to said linkage to be vibrated by the revolution of said driving member with respect to said driven rotor, a connecting rod having a wrist bearing connected to said linkage and receiving therefrom the tensional and compressive forces resulting from vibration of said mass, a crankshaft having its main bearings coaxial with the axis of said driven rotor and freely turning therein and connected to said rod, and geared means connecting said crankshaft to said driven rotor and for automatically rotating said crankshaft about said axis synchronously with the cycles of vibration of said mass in such manner that said tensional and compressive force reactions in said rod are imparted to said driven rotor unidirectionally about said axis.

15. A torque transmission device comprising a rotary driving member, a driven axis, a driven rack circuitous about said driven axis, a planetary gear in mesh with said rack, means for maintaining said planetary gear in mesh with said rack, a vibratable mass, means connecting said driving member to said planetary gear to cause revolution of said planetary gear by said driving member with alternate mutual acceleration and deceleration, and means connecting said planetary gear to said vibratable mass to cause said planetary gear to impart vibration to said mass with alternate mutual acceleration and deceleration thereby producing force reactions at the point of tooth contact between said planetary gear and said rack tending to revolve said rack about said driven axis.

16. A torque transmission device comprising a revolvable driving mass, a driven axis, a driven rack circuitous about said driven axis, a planetary gear in mesh with said rack, means for maintaining said planetary gear in mesh with said rack, a vibratable mass, means connecting said driving mass to said planetary gear to cause revolution of said planetary gear by said driving mass with alternate mutual acceleration and deceleration, and means connecting said planetary gear to said vibratable mass to cause said planetary gear to impart vibration to said vibratable mass with alternate mutual acceleration and deceleration reversely to said driving mass thereby producing force reactions at the point of tooth contact between said planetary gear and said rack tending to revolve said rack about said driven axis.

17. A torque transmission device comprising a first vibratable mass, a driven axis, a driven rack circuitous about said driven axis, a planetary gear in mesh with said rack, means for maintaining said planetary gear in mesh with said rack, a second vibratable mass, means connecting said first vibratable mass to said planetary gear to cause the latter to impart vibration to said first vibratable mass, and means connecting said second vibratable mass to said planetary gear to cause the latter to impart vibration to said second vibratable mass in opposite phase relation to said first vibratable mass thereby producing force reactions at the point of tooth contact between said planetary gear and said rack tending to revolve said rack about said driven axis.

18. A torque transmission device comprising a driven axis, a driven rack circuitous about said driven axis, revolvable vibratable masses, planetary means meshed with said rack having a fulcrum at the point of tooth contact, said means being interconnected between said masses and revolvable thereby to transmit revolution of either mass to the other mass through said fulcrum with alternate acceleration and deceleration of said masses and thereby produce on said rack a force reaction tending to rotate said rack about said driven axis.

19. A torque transmission device comprising a driven axis, a driven rack circuitous about said driven axis, vibratable masses, a planetary gear in mesh with said rack to be revolved thereabout and having a fulcrum at the point of tooth contact, means connecting said planetary gear to said masses to transmit revolution of either mass to the other mass with alternate acceleration and deceleration of said masses and thereby produce on said rack a force reaction tending to revolve said rack about said driven axis.

20. A torque transmission device comprising a driven axis, a driven rack circuitous about said driven axis, a planet gear meshed with said rack to be revolved thereabout, a lever arm mounted on said planet gear, a first revolvable vibratable mass, a second revolvable vibratable mass, means connecting said masses to said lever arm to form a revolutionary system with alternate mutual acceleration and deceleration of said masses with respect to one another thereby producing a tangential reaction on said rack tending to revolve the latter about said driven axis.

21. A torque transmission device comprising a driven axis, a driven gear revolvable about said driven axis, a planet gear meshed with said driven gear, a first revolvable vibratable mass, a second revolvable vibratable mass, means connecting said masses to points on said planet gear to form a revolutionary system with alternate mutual acceleration and deceleration of said masses with respect to one another whereby a tangential force reaction of said planet gear on said driven gear is produced tending to revolve said driven gear.

22. A torque transmission device comprising an internal gear revolvable about a driven axis, a planet gear meshed with said gear and revolvable thereabout, a journal member revolvable about said driven axis and journalling said planet gear eccentric thereto and permitting revolution of said planet gear thereabout, revolvable vibratable members, and means connecting said revolvable vibratable members to said planet gear whereby revolution of the axis of said planet gear about said driven axis in one direction will produce vibrational revolution of said revolvable vibratable members in the opposite direction.

23. A torque transmission device comprising an internal driven gear revolvable about a driven axis, a planet gear meshed with said gear and revolvable thereabout, means maintaining said planet gear in mesh with said internal gear and permitting revolution of said planet gear thereabout, revolvable vibratable masses, means connecting said revolvable vibratable masses to said planet gear whereby revolution of the axis of said planet gear about said driven axis in one direction will produce vibrational revolution of said revolvable vibratable masses in the opposite direction and reacting about said driven axis on said internal gear, and a revolvable driving member imparting revolution to said masses and to said planet gear.

ROBERT V. DERRAH.